United States Patent [19]
van Nederkassel

[11] 4,135,860
[45] Jan. 23, 1979

[54] METHOD AND DEVICE FOR CONTROLLING THE PRESSURE OF A WORKING MEDIUM DELIVERED BY A COMPRESSOR

[75] Inventor: Ludovicus J. van Nederkassel, Buggenhout, Belgium

[73] Assignee: Atlas Copco Aktiebolag, Nacka, Sweden

[21] Appl. No.: 693,297

[22] Filed: Jun. 7, 1976

[30] Foreign Application Priority Data

Jun. 23, 1975 [SE] Sweden .............................. 7507141

[51] Int. Cl.$^2$ .................... F04B 49/02; F04B 49/08
[52] U.S. Cl. ........................................ 417/12; 417/27
[58] Field of Search ..................... 417/12, 28, 26, 27

[56] References Cited

U.S. PATENT DOCUMENTS

| 2,221,857 | 11/1940 | Bartholomew | 417/12 |
|---|---|---|---|
| 2,267,959 | 12/1941 | Teach | 417/12 |
| 2,589,006 | 3/1952 | Yerger | 417/12 |
| 2,595,369 | 5/1952 | Repscha et al. | 417/27 X |
| 2,707,440 | 5/1955 | Long et al. | 417/12 |
| 2,720,355 | 10/1955 | Widmyer | 417/28 X |
| 2,741,986 | 4/1956 | Smith | 417/12 X |
| 2,793,803 | 5/1957 | Yerger | 417/27 X |
| 3,424,370 | 1/1969 | Law | 415/27 X |
| 3,994,628 | 11/1976 | Kemper | 417/12 |

*Primary Examiner*—William L. Freeh
*Assistant Examiner*—Edward Look
*Attorney, Agent, or Firm*—Eric Y. Munson

[57] ABSTRACT

Method and apparatus for controlling the operation of a motor driven compressor which is automatically unloaded when the receiver pressure reaches a predetermined maximum level and loaded when the receiver pressure reaches a predetermined minimum level by means of pressure actuated electric control means which are time delayed to start and stop the compressor motor and the unloading and loading operation in accordance with predetermined mode of operation. The compressor driving motor is controlled to stop immediately upon the receiver pressure first reaching the maximum pressure level whereupon time delay circuit means starts to measure a time interval during which the motor upon having been restarted in response to a restart pulse is prevented from further stoppage each time the maximum receiver pressure level is reached subsequent to the first, whereby the compressor can be brought on load immediately in response to demand for working medium during the measured time interval and whereby overheating of the motor between subsequent stoppages and restarts is avoided. Upon expiration of the measured time interval, the motor will stop running until the minimum receiver pressure is reached, unless the compressor should be on load at such time, in which case the motor will continue running until the compressor again is unloaded upon reaching the maximum receiver pressure level, whereupon the aforementioned cycle is repeated.

4 Claims, 3 Drawing Figures

METHOD AND DEVICE FOR CONTROLLING THE PRESSURE OF A WORKING MEDIUM DELIVERED BY A COMPRESSOR

The present invention relates to a method and a device for controlling the pressure of a working medium delivered by a compressor driven by a driving motor.

One way of keeping the delivery pressure within close boundaries comprises unloading the compressor when a predetermined upper pressure limit is reached. This means that the compressor is prevented from delivering any substantial amount of working medium while the driving motor still drives the compressor. When the delivery pressure has fallen to a lower pressure limit the compressor is loaded again. This method of controlling the pressure is the most power-consuming since the driving motor is operating continuously. When the compressor is driven unloaded the power consumption may amount to 25-30% of the power comsumption for loaded operation.

In order to decrease the power consumption it is desirable to stop the driving motor upon reaching the upper pressure limit. It is, however, not always possible to do this because most electric motors suitable for driving compressors become overheated if restarted too often. As used herein, "loading time" means the interval of time during which the compressor operates in loaded state, i.e., the time it takes for the pressure to rise from a predetermined lower level to a predetermined upper or maximum level. Similarly, "unloading time" means the interval of time during which the compressor operates in unloaded state, i.e., the time it takes for the pressure to drop from the predetermined maximum level to the predetermined lower level.

In one known control system, commonly used today, the driving motor runs on for a predetermined time after unloading of the compressor. In this way the motor is prevented from restarting too often. When the demand for working medium is high the unloading time, time it takes for the pressure to fall from the upper pressure limit is short, and, if the unloading time is shorter than the time interval during which the motor is prevented from stopping, the latter will work continuously. If on the other hand, the unloading time is longer than the predetermined time delay, the motor will stop but only after the predetermined time has elapsed. This means that the motor will work during a part of the unloading time even though there will be sufficient time delay between subsequent motor starts.

In another previously known control system the loading time is measured. If the loading time is short the demand for working medium is low and, consequently, a long unloading time is to be expected. The motor is stopped immediately when the upper pressure limit is reached if the loading time is shorter than the time corresponding to the predetermined motor starting frequency. If on the other hand, the loading time is longer than the predetermined starting frequency the motor will work continuously. While this latter method results in lower power consumption and thus lower operating costs when the demand for working medium is low as compared with the first mentioned method. On the other hand it does not prevent the motor from frequent starts if the demand for working medium should change considerably.

SUMMARY OF THE INVENTION

In comparison with the above described control methods the present invention, which is defined in the appended claims, results in lower power consumption and consequently operating costs over a considerably larger range of demands for working medium. The difference between the method according to the invention and the prior art comprises stopping the driving motor immediately when the upper pressure limit is reached a first time and preventing the motor after having been restarted, from stopping again for a predetermined time interval thereafter.

BRIEF DESCRIPTION OF THE DRAWINGS

An embodiment of the invention is described below with reference to the accompanying drawings in which.

DESCRIPTION OF AN EMBODIMENT OF THE INVENTION

Figure 1:
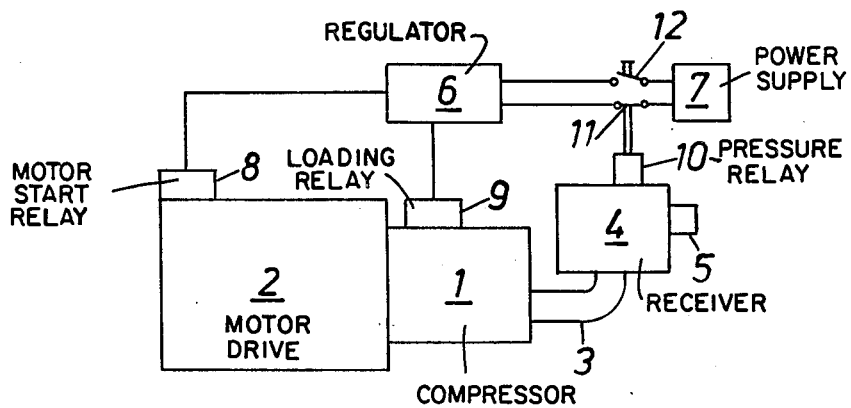
FIG. 1 shows a compressor aggregate incorporating the invention.

The compressor aggregate shown in FIG. 1 comprises a compressor 1 driven by a driving motor 2. The compressed working medium is delivered via a conduit 3 to a receiver 4 from which it can be taken off through a delivery line 5. The compressor 1 is provided with an unloading device for loading and unloading the compressor. The unloading device is here represented by a loading relay 9. For starting and stopping the driving motor 2 a motor start relay 8 is provided. The loading relay 9 and the motor start relay 8 are actuated by a regulator 6, which is driven by a power supply 7 and receives its input signals through switches 11 and 12. Switch 12 is manually operated and closed during operation of the compressor aggregate. A pressure sensor 10 is provided for sensing the pressure in receiver 4 and for actuating switch 11. Switch 11 is opened by sensor 10 when the pressure in receiver 4 reaches a predetermined upper limit level.

Figure 2:
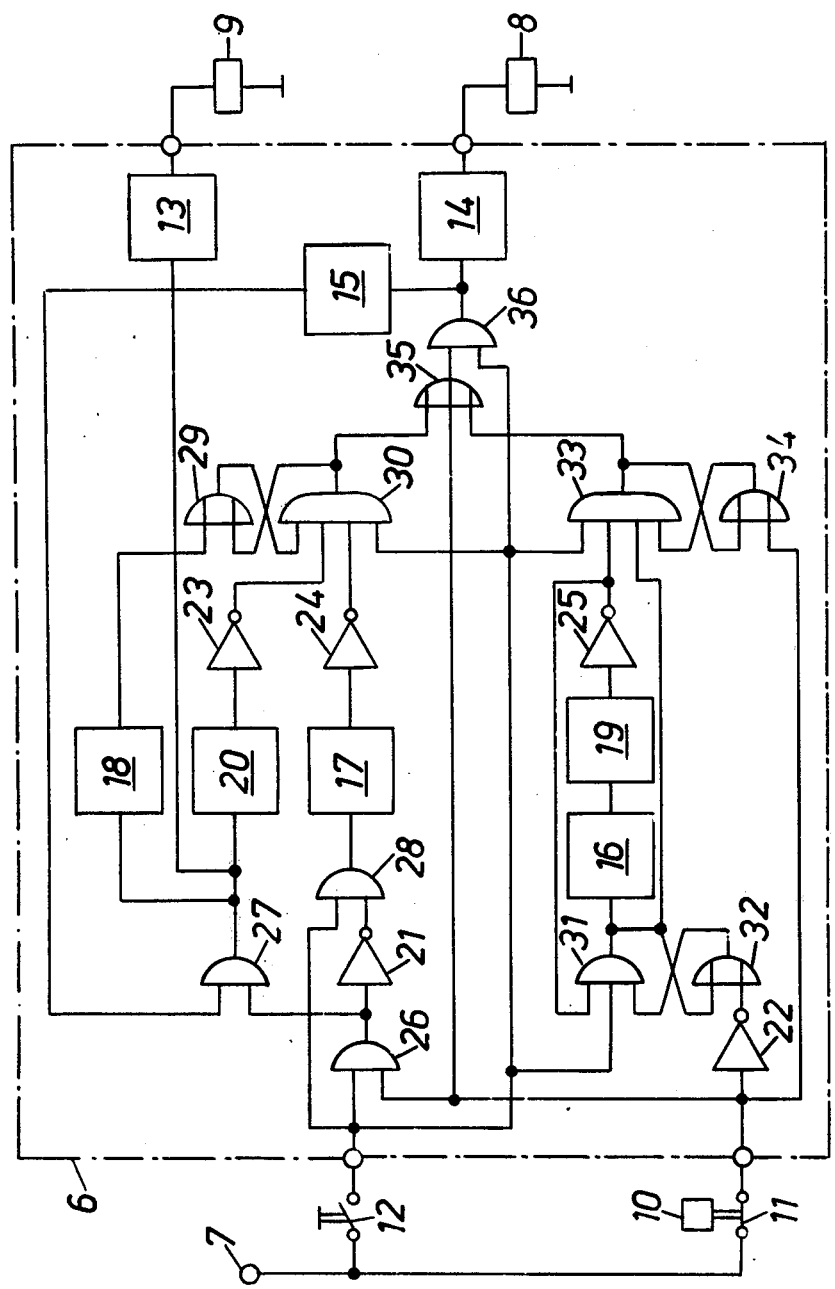
FIG. 2 shows a regulator according to the invention.

The regulator 6 is shown in FIG. 2 in form of a logic block diagram. The regulator comprises two amplifiers 13 and 14 for driving the loading relay 9 and the motor start relay 8 respectively. For the purpose of the following description the logic circuits will be assumed to have positive logic. This means that if the circuit is turned on by logic 1-level input conditions the output will obtain logic 1-level, or in other words, if input conditions are HIGH the output will become HIGH. This does, of course, not apply to the inverters 21, 22, 23, 24 and 25 for which the output is LOW when the input is HIGH and vice versa. Incorporated in the regulator are four dalay circuits 15, 16, 17 and 18 for each of which the output becomes HIGH when the input has been HIGH for a predetermined time. At any other time the output will be LOW. There are two reset pulse generators 19 and 20 each of which will transmit a logic 1-level pulse when its input becomes HIGH. At any other time the output will be LOW. The regulator also comprises seven AND-gates 26, 27, 28, 30, 31, 33 and 36 and four OR-gates 29, 32, 34 and 35. The output of an AND-gate will be HIGH if and only if all the inputs are HIGH. The output of an OR-gate will be LOW if and only if all the inputs are LOW.

The compressor aggregate is made ready for operation by closing switch 12. This means that supply voltage, which is assumed to have logic 1-level, from the power supply 7 is applied to one of the inputs of each of the AND-gates 26, 28, 31, 30, 33 and 36. These inputs will be HIGH throughout the description. As a starting point it is assumed that the pressure in receiver 4 is low and consequently switch 11 is closed. The supply voltage is therefore also applied to the other input of gate 36 through gate 35. Both inputs of gate 36 being HIGH and thus relay 8 energized the driving motor 2 will start. At this moment the compressor 1 is unloaded. A predetermined time, sufficient for the driving motor to gain speed, after the output of gate 36 became HIGH, the output of delay circuit 15 becomes HIGH and consequently one of the inputs of gate 27 becomes HIGH. Since the other input already is HIGH because supply voltage is applied to both inputs of gate 26 relay 9 will become energized so as to load the compressor 1. Working medium is now delivered by the compressor to the receiver 4. If less medium is taken away through the delivery line 5 than is delivered through conduit 3 the pressure will rise in the receiver. When the receiver pressure reaches an upper limit level switch 11 is opened by pressure sensor 10.

The outputs of gates 30 and 33 are assumed to be LOW when switch 11 opens for the first time. This means that the supply voltage is taken away from one of the inputs of gate 36 and consequently that the driving motor 2 is stopped. At the same time the supply voltage is taken away from one of the inputs of gate 26 so that the compressor 1 becomes unloaded. When switch 11 opens, the output of inverter 22 becomes HIGH and consequently one of the inputs of gate 31 becomes HIGH. The middle input of gate 31 is HIGH since supply voltage is applied. The third input of gate 31 is HIGH, which it always is except for the short time during which the output of inverter 25 is LOW because a reset pulse has been delivered from the reset pulse generator 19. The output of gate 31 is thus HIGH and will stay HIGH because of the interconnection between gates 31 and 32 as long as the output of inverter 25 stays HIGH. When the output of gate 31 becomes HIGH delay circuit 16 starts measuring a predetermined time during which the driving motor 2 is to be prevented from stopping again. When the pressure in the receiver 4 has fallen to a lower limit level switch 11 is closed by pressure sensor 10. The driving motor 2 is started and after some delay the compressor 1 becomes loaded as described above. Supply voltage is applied to one of the inputs of gate 34 through switch 11. As a consequence the lowermost input of gate 33 becomes HIGH. Since the other inputs of gate 33 are HIGH the output of gate 33 becomes HIGH. As long as the output of gate 33 is HIGH, which it will be because of the interconnection between gates 33 and 34, relay 8 will remain energized. The driving motor 2 is in this way prevented from stopping if switch 11 opens before delay circuit 16 has measured its predetermined time. At the end of the predetermined time the output of delay circuit 16 becomes HIGH and consequently the reset pulse generator 19 delivers a logic 1-level pulse to inverter 25 whose output becomes LOW for a short while. As a result of this logic 0-level pulse the outputs of gates 31 and 33 become LOW. This can happen either when switch 11 is open or when it is closed. If switch 11 is open the driving motor 2 is running and the compressor 1 is unloaded. In this case the driving motor will stop immediately since all inputs of gate 35 will be LOW. Since the output of inverter 22 is HIGH, delay circuit 16 will start measuring its predetermined time interval again at the termination of the reset pulse. If, on the other hand, switch 11 is closed, the driving motor 2 will continue running with the compressor 1 loaded and the output of gate 31 is LOW until switch 11 opens and the driving motor 2 stops, the compressor is unloaded and delay circuit 16 starts measuring again the predetermined time.

If the demand for working medium approaches the capacity of the compressor the loading time will be long and the unloading time will be short. In such a case it would be possible to stop the driving motor each time the compressor is unloaded. Since the compressor is loaded almost continuously there is only little to be gained by doing so and since it takes some time from the initiation of a motor start until the compressor runs loaded it is better to run the driving motor continuously when the loading time exceeds a certain value so as to avoid severe pressure drops.

In order to prevent the driving motor 2 from stopping when the loading time exceeds a predetermined value, regulator 6 is provided with a delay circuit 18. The compressor 1 becomes loaded each time the output of gate 27 becomes HIGH. When this occurs reset pulse generator 20 transmits a logic 1-pulse so as to make the output of inverter 23 and thus gate 30 LOW. At the same time delay circuit 18 starts measuring a predetermined time. If the compressor 1 stays loaded the output of delay circuit 18 becomes HIGH at the end of that time. This makes one of the inputs of gate 30 HIGH through gate 29. Since the other inputs of gate 30 are high its output becomes HIGH. Through gates 35 and 36 the driving motor 2 will thus be prevented from stopping. Because of the interconnection between gates 29 and 30 the output of gate 30 will stay HIGH as long as the two middle inputs of gate 30 stay HIGH. When the compressor 1 becomes unloaded the output of inverter 21 becomes HIGH and consequently the output of gate 28 becomes HIGH. When this occurs delay circuit 17 starts measuring another predetermined time being a maximum unloading time during which the driving motor 2 may be prevented from stopping. At the end of the maximum unloading time the output of delay circuit 17 becomes HIGH and thus the output of inverter 24 LOW. The output of gate 30 will therefore become LOW and the driving motor 2 will no longer be prevented from stopping by gate 30. Delay circuit 17 has been incorporated in order to avoid that the driving motor 2 is prevented from stopping too long in case the demand for working medium suddenly should decrease considerably after a long loading time.

Figure 3:
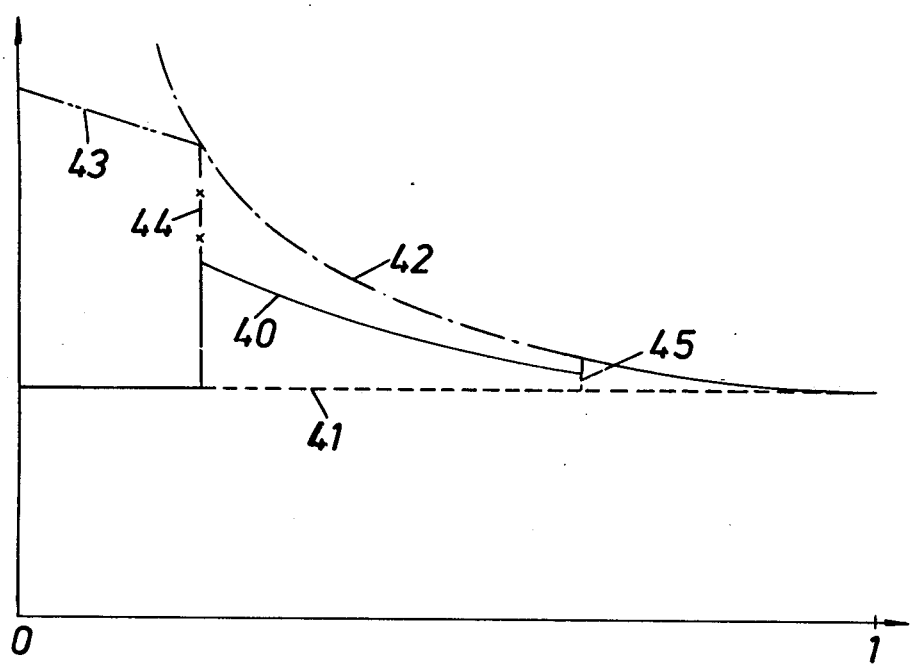
FIG. 3 is a diagram comparing the operating costs of the invention with some prior art.

In FIG. 3 the operating costs for the compressor aggregate divided by the amount of delivered working medium is shown along the vertical axis and the amount of delivered working medium divided by the compressor capacity along the horizontal axis for some control methods. The diagram is only meant for qualitative comparison and does not relate to any specific compressor aggregate although the same aggregate has been used throughout the calculations. The horizontal line 41 relates to the case in which the driving motor 2 is stopped each time the compressor 1 is unloaded and started when the compressor is loaded. The curve 42 relates to the control method in which the motor is driven continuously. The costs for using the control method and regulator according to the present invention is shown as a full line. Below a certain demand for working medium indicated by the line 44 the cost curve for the present invention coincides with line 41. Above this demand and below another higher demand, indicated by the dots 45 the invention operates according to curve 40. When the demand for working medium approaches the compressor capacity operation is according to curve 42 in order to avoid severe pressure drops. In the prior art where stopping of the driving motor is delayed for a certain time after unloading of the compressor the cost curve deviates from the continuous curve 42 through following the line 43 when the demand for working medium is low. In the other prior art described above, which gives no guarantee that the driving motor is not started too frequently if the demand for working medium changes considerably, the cost curve follows line 41 for demands below that indicated by line 44 and curve 42 above that demand.

The above described and in the drawings shown embodiment of the invention is only to be regarded as an example which may be modified within the scope of the appended claims.

What I claim is:

1. In the method of controlling the operation of a motor driven compressor system, in which the compressor is automatically unloaded when the receiver pressure reaches a predetermined maximum level and loaded when the receiver pressure reaches a minimum level by electric circuit means including sensor means and motor actuating means which are timed to start and stop the motor and unload and load the compressor in accordance with a predetermined mode of operation, the improvement in said method providing maximized start-stop frequency with minimized risk of overheating of the motor and savings in wear and energy consumption, comprising:
   (a) stopping the motor immediately upon the receiver pressure reaching the maximum pressure level and unloading the compressor;
   (b) restarting the motor in response to a restart pulse signal; and
   (c) activating time delay means in response to said restart pulse signal for measuring a time interval upon each first stoppage of the motor upon the receiver pressure reaching the maximum level, said time delay means being effective to prevent the motor upon having been restarted from further stoppage during the time interval measured by said time delay means each time subsequent to said first stoppages that the maximum receiver pressure level is reached during said measured time interval.

2. A method according to claim 1, in which the driving motor (2) is allowed to stop if the unloading time exceeds a predetermined value.

3. In a compressor system in which a compressor (1) driven by a motor (2) is automatically unloaded when a receiver pressure reaches a predetermined maximum level and loaded when the receiver pressure reaches a predetermined minimum level by electrical circuit means including receiver pressure sensor means and motor stopping means which are timed to start and stop the motor to unload and reload the compressor in accordance with a predetermined mode of operation, the improvement in said system providing maximized start-stop frequency with minimized risk of overheating of the motor and savings in wear and energy consumption, comprising:
   (a) regulating means (6) in said electrical circuit operative to actuate said motor stopping means (8) to stop the driving motor immediately in response to a signal by said sensor means (10) when the receiver pressure reaches the predetermined maximum level and to unload the compressor;
   (b) restart means in said electric circuit means operative to restart the motor in response to a restart signal; and
   (c) time delay means (16) controlled by said sensor means (10) for measuring a predetermined interval of time upon each first stoppage of the motor upon the receiver pressure reaching said maximum level and means in said circuit for preventing the motor upon having been restarted from further stoppage during said predetermined interval of time each time subsequent to each first stoppage that the maximum receiver pressure level is reached during the measured interval of time.

4. A device according to claim 3, in which said regulating means (6) comprises second delay means (17) for allowing said stopping means (8) to stop the driving motor (2) if the unloading time of the compressor (1) exceeds a predetermined value.

* * * * *